us011194671B2

(12) United States Patent
Shiihara

(10) Patent No.: US 11,194,671 B2
(45) Date of Patent: Dec. 7, 2021

(54) SYSTEM AND METHOD USING THE SAME

(71) Applicant: CANON KABUSHIKI KAISHA, Tokyo (JP)

(72) Inventor: Takeshi Shiihara, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 44 days.

(21) Appl. No.: 16/256,278

(22) Filed: Jan. 24, 2019

(65) Prior Publication Data
US 2019/0250996 A1 Aug. 15, 2019

(30) Foreign Application Priority Data

Feb. 13, 2018 (JP) .............................. JP2018-023424

(51) Int. Cl.
G06F 11/14 (2006.01)
G06F 9/451 (2018.01)

(52) U.S. Cl.
CPC .......... *G06F 11/1464* (2013.01); *G06F 9/451* (2018.02); *G06F 11/1451* (2013.01); *G06F 11/1469* (2013.01)

(58) Field of Classification Search
CPC ............. G06F 11/1464; G06F 11/1451; G06F 11/1469; G06F 9/451; G06F 2201/86; G06F 11/1438; G06F 11/2094; G06F 11/1448; G06F 9/45558; G06F 2009/45587
See application file for complete search history.

(56) References Cited

U.S. PATENT DOCUMENTS

| 9,430,331 | B1* | 8/2016 | Basov | G06F 11/1451 |
| 2010/0107158 | A1* | 4/2010 | Chen | G06F 11/1484 718/1 |
| 2015/0134717 | A1* | 5/2015 | Naganuma | G06F 11/1464 709/201 |

FOREIGN PATENT DOCUMENTS

JP H06243013 A 9/1994

* cited by examiner

*Primary Examiner* — David Yi
*Assistant Examiner* — Alan Otto
(74) *Attorney, Agent, or Firm* — Rossi, Kimms & McDowell LLP

(57) ABSTRACT

A network device includes a first request unit configured to issue a first request for requesting information indicating a storage destination in which data stored in a storage device of the network device is stored as backup data and a transmission unit configured to transmit data stored in the storage device using the information indicating the storage destination received in response to the first request. A data management system includes a first response unit configured to respond with the information indicating the storage destination to the network device in response to the first request. In response to storing of the differential backup data from the network device in a storage system, before the differential backup data is stored, a process of merging full backup data managed in the storage system and the differential backup data is performed.

8 Claims, 13 Drawing Sheets

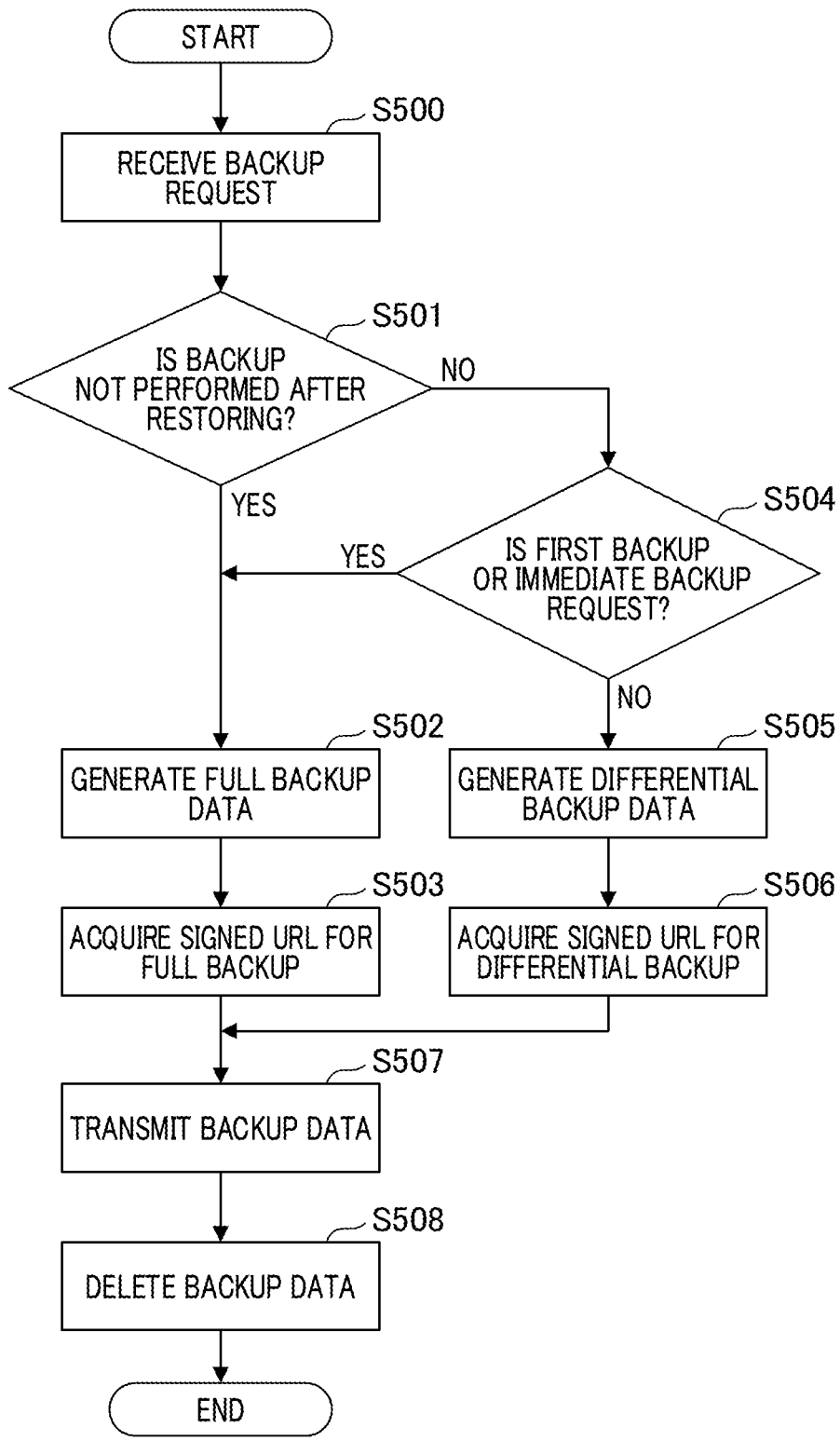

SYSTEM AND METHOD USING THE SAME

BACKGROUND OF THE INVENTION

Field of the Invention

The present invention relates to a system used for a cloud backup and restoring process of a network device and a method using the same.

Description of the Related Art

In recent years, there has been increasing demand for backup of image forming devices. Generally, a copying machine such as an image forming device includes many driving components such as motors. When a component has failed, the component is replaced or the machine is replaced with an alternative machine, and the operation continues. However, when a storage component that maintains data necessary for the operation has failed, it is necessary to restore the data to a state before the data failed. Thus, it is necessary to periodically backup data of the image forming device and provide a method of restoring backed up data when a component has failed.

However, when there are many types of data to be handled and data has a large volume as in an image forming device, preparing a storage server in a client environment is not realistic. Although a method of providing servers in a cloud may be conceived, since backup data is transmitted from a large number of image forming devices, the operation costs are high because it is necessary to perform maintenance every time while monitoring a communication load between clients and servers and a storage capacity.

Thus, in recent years, building of a system having a serverless architecture and utilization of a cloud storage service specific to data storage have been focused on. In the system having a serverless architecture, functions constituting an application are registered and managed in a program execution environment that a cloud vendor provides. The system is configured in the form in which the image forming device calls functions on the cloud. Thereby, it is not necessary to perform server management which is necessary conventionally, and it is possible to reduce the operation costs.

In addition, when a storage service for which server management that a cloud vendor provides is not necessary is used, it is possible to distribute a load due to management and communication of data with a large volume handled by the system. In particular, when there are many types of data to be handled and the data has a large volume as in an image forming device, a cloud storage service that does not require capacity extension and monitoring is utilized, and thus it is possible to reduce the operation and management costs of the system.

In Japanese Patent Laid-Open No. H6-243013, a method of reducing a load of a backup process and reducing a load for communication with a server is proposed. According to the system disclosed in Japanese Patent Laid-Open No. H6-243013, in a backup process of an information processing device, a device to be backed up transmits only data different from a previous backup to a data storage server.

In the system disclosed in Japanese Patent Laid-Open No. H6-243013, when the device performs restoring from the backup, an amount of differential backup data acquired varies depending on the state at a time to which the device is restored. For example, when the state is restored to the latest state immediately before the device failed, it is necessary for the device to acquire and trace all differential backup data and generate setting and content data for restoring. That is, when a period for which a backup function is used is longer, a larger load is applied during restoring, and a time during which the device cannot be used is longer.

SUMMARY OF THE INVENTION

Therefore, the present invention proposes an optimal method for minimizing a time required for a restoring process of a device in a cloud backup system of an image forming device constituted by a serverless architecture and a cloud storage service.

A system according to an example of the present invention includes a network device, a storage system, and a data management system. The network device includes a first request unit configured to issue a first request for requesting information indicating a storage destination in which data stored in a storage device of the network device is stored as backup data and a transmission unit configured to transmit data stored in the storage device using the information indicating the storage destination received in response to the first request. The data management system includes a first response unit configured to respond with the information indicating the storage destination to the network device in response to the first request. When the data transmitted from the network device is not full backup data, but is differential backup data, in response to storing of the differential backup data in the storage system, before the differential backups data is stored, a process of merging the full backup data managed in the storage system and the differential backup data is performed.

Further features of the present invention will become apparent from the following description of exemplary embodiments (with reference to the attached drawings).

BRIEF DESCRIPTION OF THE DRAWINGS

FIG. 5 is a flowchart showing an example of a backup process.

DESCRIPTION OF THE EMBODIMENTS

Preferred embodiments for implementing the present invention will be described below with reference to the drawings.

EXAMPLE 1

A network system for managing a network device according to an example of the present invention will be described. As an example of a network device, in this example, a multi-function peripheral (MFP), that is, a copying machine having a complex function, will be exemplified. Examples of the network device include those other than MFPs such as a printer and a facsimile. Hereinafter, these are generally referred to as an "image forming device."

<System Configuration>

Figure 1:
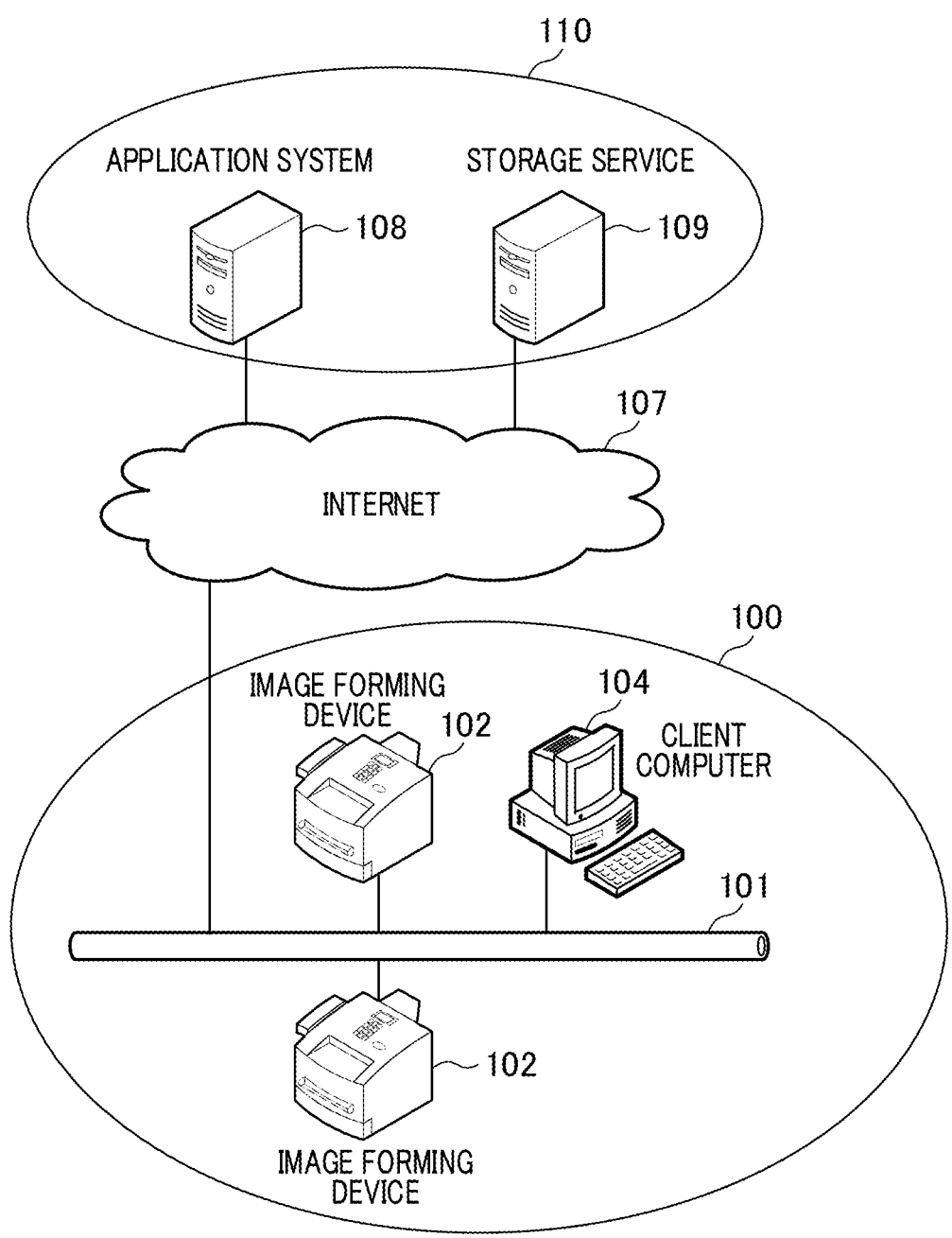
FIG. 1 is an overall view showing an example of a system.

FIG. 1 is an overall view of a system according to an example of the present invention. The system of this example is a backup system of an image forming device and includes a plurality of image forming devices and a backup application system on a cloud that manages data of the image forming device.

In FIG. 1, a local area network (LAN) 101 is a LAN of a client environment 100. An image forming device 102 is connected to the LAN 101 and can provide a print process and a scan process, and a plurality of other functions in response to a request from another network device such as a client computer 104 connected to the same network. The image forming device 102 is additionally connected to the Internet 107 via the LAN 101. The image forming device 102 transmits backup data of the image forming device 102 to the application system 108 as a data management system built into a cloud infrastructure 110 via the Internet 107. In addition, the image forming device 102 also transmits the backup data to a storage service 109 as a storage system.

The application system 108 functions as a data management system and has a function of managing the image forming device 102 in a unified manner. In addition, it also has a management screen. The storage service 109 as a storage system manages data transmitted from the image forming device 102. The storage service 109 is connected according to an HTTPS request for a signed URL issued from the application system 108. The storage service 109 receives a backup data transmission and reception request from the image forming device 102 according to the signed URL.

FIG. 1 shows a state in which the plurality of image forming devices 102 are connected via the LAN 101 and also a state in which the image forming device 102, the application system 108, and the storage service 109 are connected via the Internet 107.

<Hardware Configuration of System>

Figure 2A:
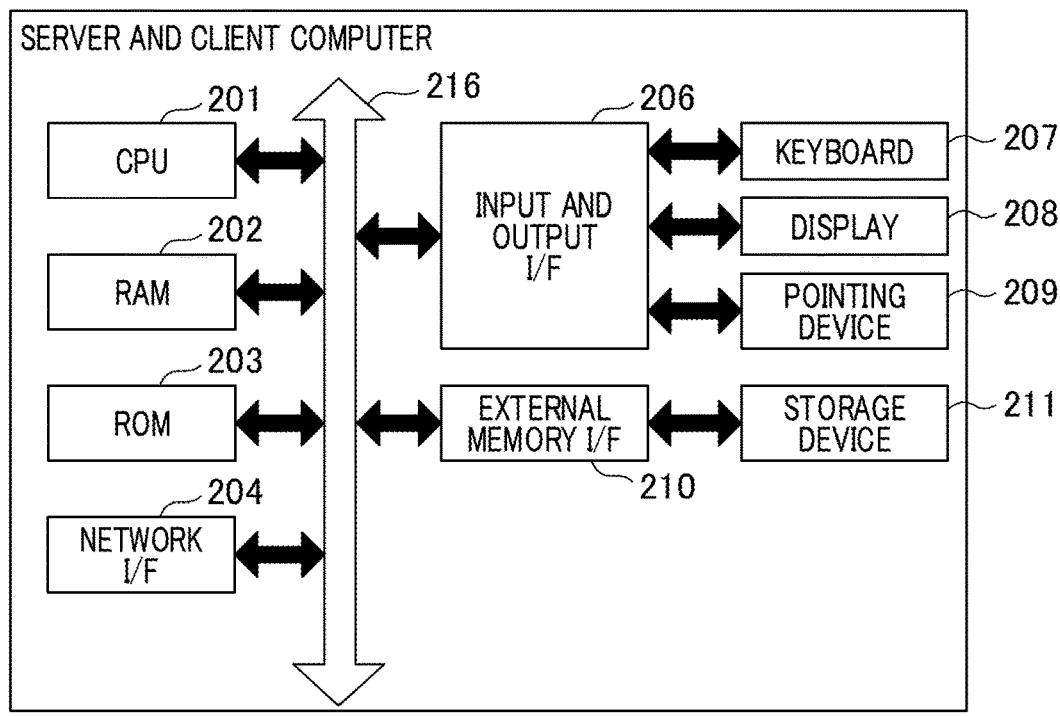
FIG. 2A and FIG. 2B are diagrams showing an example of a hardware configuration of a system.
Figure 2B:
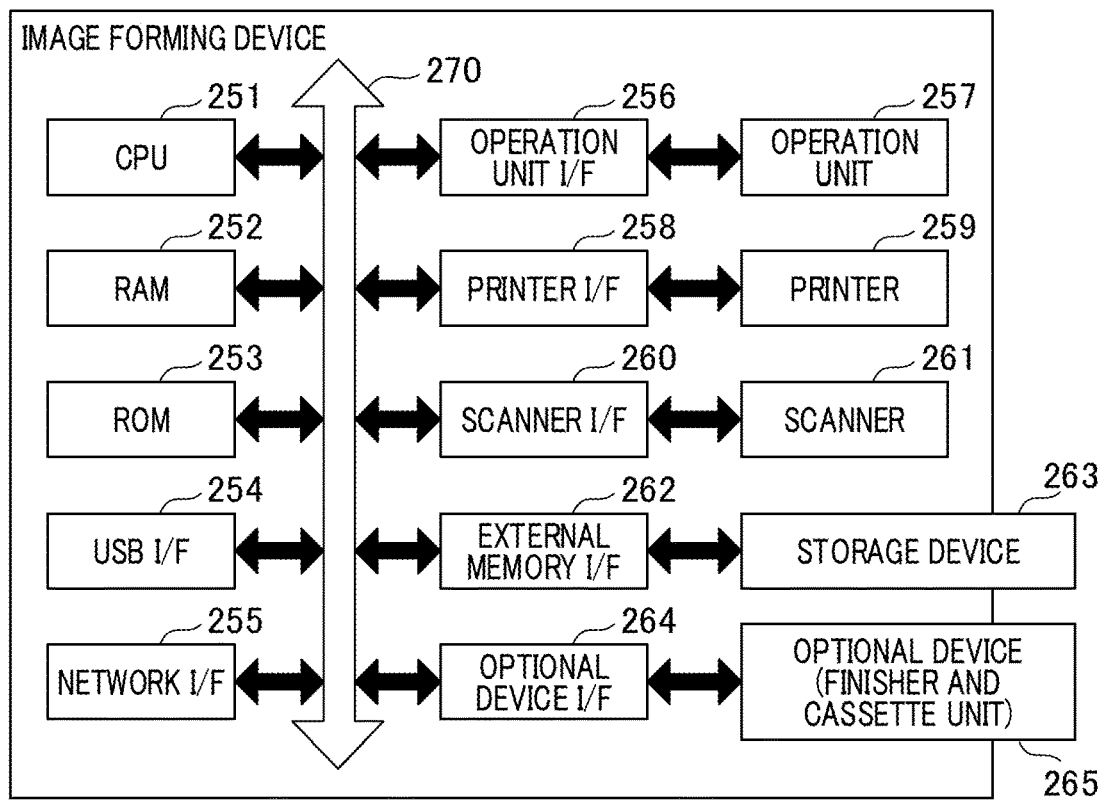

FIG. 2A and FIG. 2B are block diagrams showing a hardware configuration of a network system. FIG. 2A shows an example of an internal configuration of a server constituting a data center in which the cloud infrastructure 110 in which the application system 108 and the storage service 109 operate operates and an internal configuration of the client computer 104.

In FIG. 2A, 201 indicates a CPU, which executes a process based on an application program or the like stored in a ROM 203 or a storage device 211. In addition, the CPU 201 comprehensively controls devices connected to a system bus 216. In addition, the CPU 201 opens various application windows registered based on a command instructed by a mouse cursor (not shown) on a display 208 and executes various types of data processing.

202 indicates a RAM, which functions as a main memory, a work area, and the like of the CPU 201. 203 indicates a ROM which is a read only memory functioning as a storage area of a basic I/O program and the like. An operating system program (hereinafter referred to as an OS) which is a control program of the CPU 201 is stored in the ROM 203 or a storage device 211. In addition, files and various other data items used during processing based on the application program and the like are stored in the ROM 203 or the storage device 211. 204 indicates a network I/F (interface) which is connected to the Internet 107 through a firewall (not shown). Here, a network that can be connected to the network I/F 204 may be a wired or wireless network.

206 indicates an input and output I/F which controls input from a keyboard 207 and a pointing device 209 such as a mouse and output to the display 208. 210 indicates an external memory I/F, which controls access to the storage device 211 such as a hard disk (HD). 211 indicates a storage device, which stores a boot program, various applications, user files, edit files, and the like. A server and the storage service 109 constituting the cloud infrastructure 110 operate when the CPU 201 executes a basic I/O program and an OS written in the ROM 202 or the storage device 211. The basic I/O program is written in the ROM 203, and the OS is written in the ROM 203 or the storage device 211. Thus, when a power supply of a computer is turned ON, the OS is written in the RAM 202 from the ROM 203 or the storage device 211 according to an initial program load function in the basic I/O program and the operation of the OS starts.

The internal configuration of the server constituting the cloud infrastructure 110 and the internal configuration of the client computer 104 have been described above using FIG. 2A in common for convenience of description. Here, the application system 108 and the storage service 109 virtually realize the internal configuration in FIG. 2A as virtual machines on a cloud.

FIG. 2B shows an example of an internal configuration of the image forming device 102. In the image forming devices 102 and 103, 251 indicates a CPU, which outputs an image signal as output information to a printer 259 through a printer I/F 258 connected to the system bus 270 based on a control program or the like. Here, the control program is stored in a ROM 253, a storage device 263, or the like.

The CPU 251 can perform a process of communicating with an external computer device through a network I/F 255 and is configured to notify an external server of information in the image forming device 102 and the like. In addition, the CPU 251 performs a process based on an application program or the like stored in the ROM 253 or the storage device 263. 252 indicates a RAM which functions as a main memory, a work area, and the like of the CPU 251, and a memory capacity can be extended with an optional RAM connected to an extension port (not shown). Here, the RAM 252 is used for an output information loading area, an environment data storage area, a non-volatile (NV) RAM, and the like.

253 indicates a ROM, and 263 indicates a storage device such as a hard disk (HD). In the ROM 253 or the storage device 263, a control program and an application program of the CPU 251, font data used when the output information is generated, information used in the image forming device 102, and the like are stored. In addition, in the ROM 253 or the storage device 263, an application is temporarily stored when the application of the image forming device 102 is installed. 254 indicates a USB I/F which controls data communication with an external device through USB connection. For example, it may be connected to the client computer 104 to be described below through a USB. The client computer 104 can perform various print operations and scan operations through the USB I/F 254.

256 indicates an operation unit I/F which controls an interface with respect to an operation unit 257 and outputs image data to be displayed to the operation unit 257. In addition, it also receives information input by a user using the operation unit 257. 257 indicates an operation unit which corresponds to an operation panel on which a switch for operation, an LED display device, and the like are disposed. 258 indicates a printer I/F and outputs an image signal as output information to the printer 259 (printer engine).

260 indicates a scanner I/F which receives an image signal as input information from a scanner 261 (scanner engine). 262 indicates an external memory I/F (memory controller) which controls access to an external memory such as a hard disk (HD). 264 indicates an optional device I/F, which controls access to an optional device 265 such as a finisher and a cassette unit. The optional device may be a peripheral device that extends a function and a mechanism of an MFP such as a camera and an IC card reader in addition to a finisher and a cassette unit. 270 indicates a system bus which connects devices.

<Middleware Configuration of Cloud Infrastructure>

Figure 3:
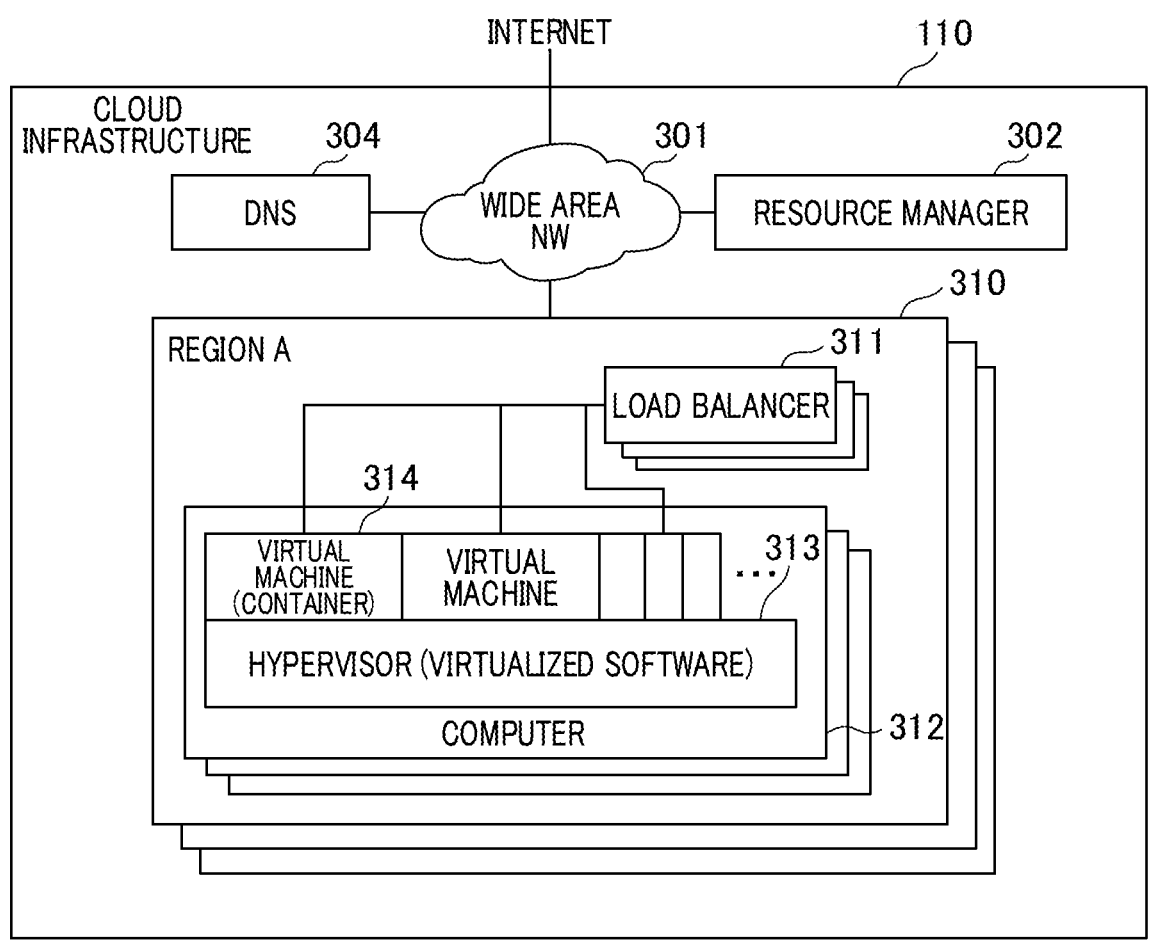
FIG. 3 is a diagram showing an example of a middleware configuration of a system.

FIG. 3 shows an example of a middleware configuration of the cloud infrastructure 110. The application system 108 and the storage service 109 are composed of virtual machines built and managed over the cloud infrastructure 110 and associated resource groups. The application system 108 and the storage service 109 process a request transmitted from a network device and a relay device in the client environment 100 and provide a service according to resources built and managed over the cloud infrastructure 110.

A wide area network 301 is a wide area network via which services in cloud services are connected. Resources in cloud services are connected to each other across data center regions via the wide area network 301. A resource manager 302 generates or deletes resources constituting a service and performs a resource amount adjusting process according to a load of resources. Adjustment of an amount of resources includes scaling out to increase the number of virtual machines and scaling up to increase allocation of hardware resources to a virtual machine. In addition, adjustment of an amount of resources includes scaling in to reduce the number of virtual machines and scaling down to reduce allocation of hardware resources to a virtual machine.

Hardware resources include a CPU (number of cores), a memory (size), a storage (size), and the like. The resource manager 302 can monitor an amount of requests for resources and adjust automatically an amount of resources according to a processing load. The processing load is a load applied to processing in the virtual machine and indicates a CPU usage rate or a memory usage rate of the virtual machine, a response time for a response, and the like. Adjustment of an amount of resources performed by the resource manager 302 when an amount of requests monitored and the processing load satisfy preset conditions is referred to as autoscale. In addition, the resource manager 302 switches a resource destination that receives a request from the client environment 100 by rewriting a DNS record registered in a DNS 304 to be described below. Examples of resources for receiving a request from the client environment 100 include a load balancer 311 and a virtual machine 314 which will be described below.

In the DNS 304, address information such as IP addresses of respective virtual machines and load balancers and a host name are registered. A computer or a network device in the client environment 100 performs communication with the DNS 304 via a network such as the Internet. The above computer or network device makes an inquiry regarding address information corresponding to a host name of a load balancer in a processing system as a request connection destination to the DNS 304, and transmits a request for address information returned from the DNS 304. In response to the received request, the DNS 304 returns a host name or address information indicating a load balancer in the processing system as a request connection destination using a DNS record based on a DNS name.

A region 310 is one of regions in the cloud infrastructure 110. A system administrator designates an arbitrary region and requests generation of resources such as the virtual machine 314 and the load balancer 311 from the resource manager 302. The resource manager 302 generates resources designated in the designated region. The load balancer 311 and the virtual machine 314 to be described below are generated in the region 310 in response to a request from the system administrator. The load balancer 311 functions as a load balancer for distributing requests to a system. A plurality of load balancers 311 may be generated according to the scale of the system and autoscale settings.

A computer 312 is an information processing device for operating a hypervisor 313 and the virtual machine 314. Here, the hypervisor 313 is software that virtualizes a computer and can execute a plurality of different OSs in parallel. In addition, the virtual machine 314 is a virtual computer that is activated on the computer 312 by the above hypervisor 313. The computer 312 is a server machine physically built into the region 310. According to machine specifications and the number of computers 312 physically built into the region 310, the number of virtual machines 314 with specific machine specifications that can be activated in the region 310 changes. The virtual machine 314 can include an OS, an application server, a system, an application configuration, and the like that can be selected by the system administrator. Since the configuration of the computer 312 is the same as that of FIG. 2A, description thereof will be omitted.

<Functional Configuration of System>

Figure 4A:
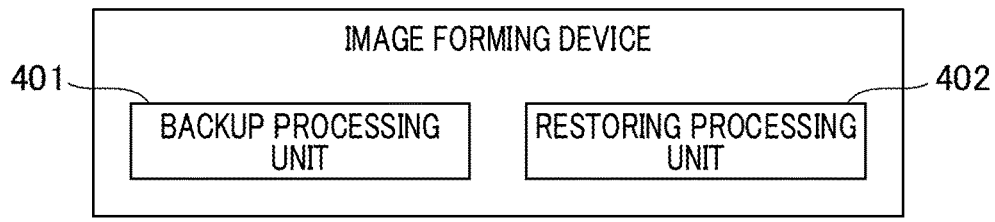
FIG. 4A to FIG. 4C are diagrams showing an example of a software configuration of a system.
Figure 4B:
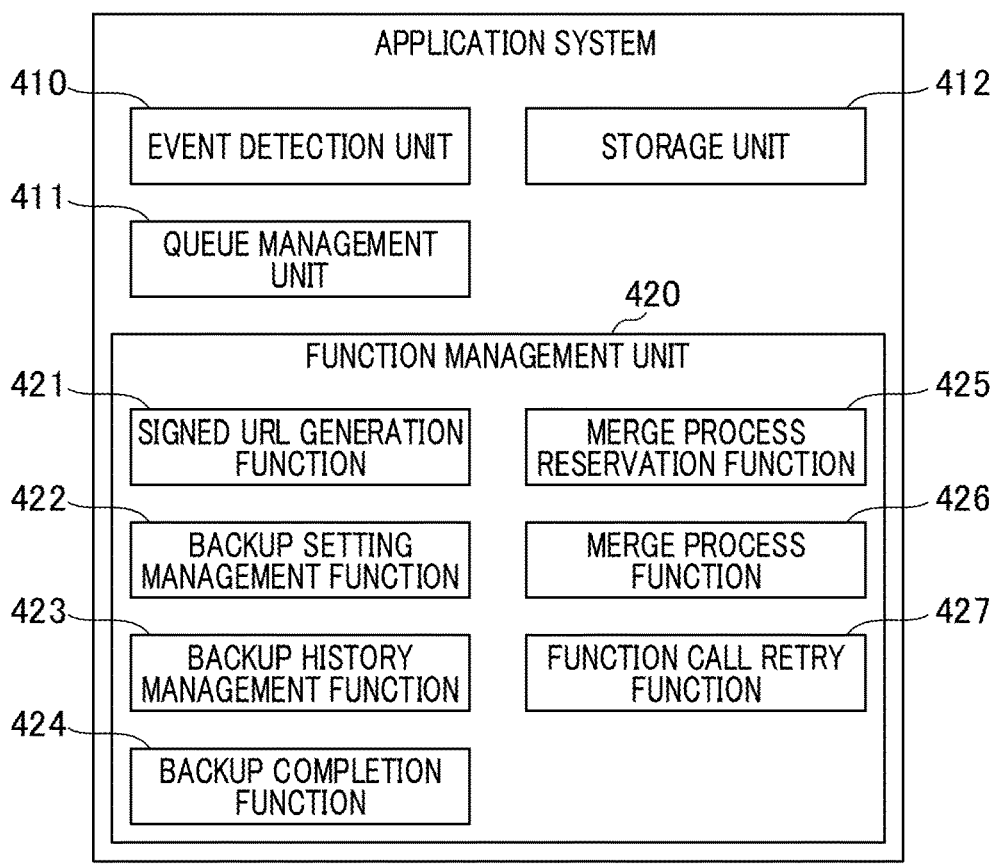
Figure 4C:
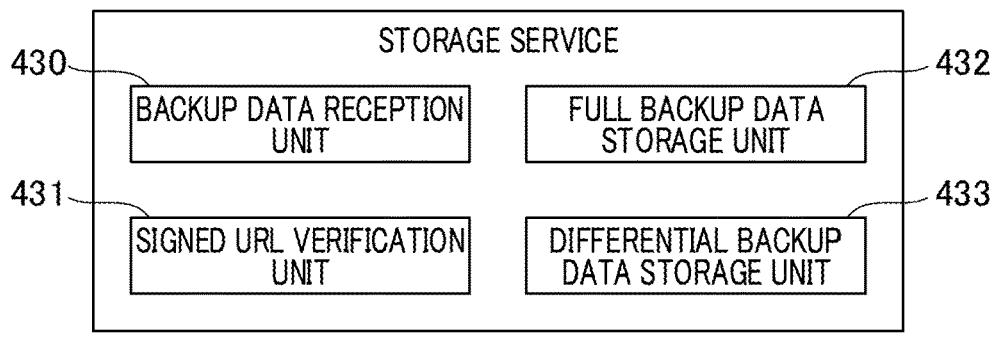

FIG. 4A to FIG. 4C are block diagrams for explaining a functional configuration of a network system including an image forming device. FIG. 4A is a diagram showing a functional configuration of the image forming device 102. Here, an application program of the image forming device 102 in FIG. 4A is stored in the storage device 263 in FIG. 2B, read in the RAM 252 and the ROM 253, and executed by the CPU 251.

A backup processing unit 401 is an application program for performing a backup process that is operated in an image forming device. The backup processing unit 401 performs a process of creating backup data and a process of transmitting backup data to the storage service 109 according to a backup processing flow in FIG. 5 to be described below.

Here, types of backup data include a full backup and a differential backup. The full backup includes setting values and data for constituting the image forming device 102, and the differential backup includes only setting values and data that have changed from the previous backup. During initial backup and immediately after a restoring process, a full backup is generated, and during subsequent operations, a differential backup is generated and transmitted to the cloud.

Thereby, a backup data generation load on the image forming device 102 and a communication load on the storage service 109 are reduced.

A restoring processing unit 402 is an application program for restoring a state of the image forming device from the backup data managed in the storage service 109. The restoring processing unit 402 acquires backup data from the storage service 109 and performs a restoring process according to a restoring processing flow in FIG. 6 to be described below.

Both the backup processing unit 401 and the restoring processing unit 402 include a UI screen through the operation unit 257 of the image forming device 102 and have a function of receiving a user operation through the UI screen. In addition, the backup processing unit 401 and the restoring processing unit 402 may be pre-installed in the image forming device 102 as a bundle application, and may be provided in a form installed through an external medium or the Internet after the image forming device 102 is initially setup.

FIG. 4B shows a functional configuration of the application system 108 as a data management system. Here, a function group of the application system 108 in FIG. 4B is read in a memory area virtually formed in the virtual machine (container) 314 in FIG. 3 and executed by a virtual CPU of the virtual machine (container) 314.

An event detection unit 410 calls functions registered in a function management unit 420 in response to various events of an application system and a storage service according to a flow in FIG. 14 to be described below. Call condition information about events and functions is managed in a function management table in a storage unit 412. A queue management unit 411 manages resources of a "merging process reservation queue" and a "function call failure queue" used in flows of FIG. 10, FIG. 11, FIG. 12, and FIG. 14 to be described below. Of course, queue resources necessary for operating an application system may be managed. The storage unit 412 stores various data items used in various functions managed by the event detection unit 410 and the function management unit 420. The storage unit 412 adds, reads, updates, and deletes records of tables of various data items in response to requests from other functions.

Here, Tables 1 to 4 show tables of various data items in the storage unit 412.

Table 1 is a backup service contract management table. Here, the device ID is an identifier that uniquely identifies the image forming device 102. The tenant ID is an identifier for uniquely identifying a tenant that possesses the image forming device 102. The tenant ID is a unit for securely separating resources when a web service provided by the application system 108 is used for various organizations and individuals. Such a system is generally referred to as a multi-tenant system. A backup service contract state is a use agreement contract state of a backup service for each image forming device. For example, when a client agrees and backup in cooperation with a cloud is valid, state information of "under contract" is stored, and otherwise, state information such as "not contracted" is stored.

TABLE 1

Backup service contract management table

| Device ID | Tenant ID | Backup service contract state |
|---|---|---|
| D10001 | TN001 | Under contract |
| D10002 | TN002 | Not contract |
| D10003 | TN003 | Under contract |
| ... | ... | ... |

TABLE 2

Backup setting management table

| Device ID | Number of backup maintenance generations | Backup storage period | Backup transmission interval |
|---|---|---|---|
| D10001 | 50 generations | One year | every Thursday at 22:00 |
| D10003 | — | Six months | every day at 22:00 |
| ... | ... | ... | ... |

Table 2 is a backup setting management table. Here, the device ID is an identifier for uniquely identifying a device. The number of backup maintenance generations is the number of generations of backup data that the storage service 109 maintains. A backup storage period is a period during which the storage service 109 maintains backup data transmitted from the backup processing unit 401. A backup transmission interval is date and time information about a timing at which the backup processing unit 401 generates and transmits backup data. The date and time information may be set based on a day of the week such as "every Thursday at 22:00" or a daily basis such as "every day at 22:00." Setting information that is managed in the backup setting management table in Table 2 includes a UI for setting by a backup processing unit of the image forming device 102 and a client can set using the UI. In addition, a WebUI of an application system server may be used for setting.

TABLE 3

Backup history management table

| History ID | Device ID | Storage destination path information | Backup type | State | Update date and time |
|---|---|---|---|---|---|
| 100 | D10001 | https://region-a.***/TN001/D10001/full/20170720-103013.tar.gz | Full | Stored | 2017/07/20 10:30:13 |
| 101 | D10001 | https://region-a.***/TN001/D10001/partial/20170720-151250.tar.gz | Differential | Deleted | 2017/07/20 |

TABLE 3-continued

Backup history management table

| History ID | Device ID | Storage destination path information | Backup type | State | Update date and time |
|---|---|---|---|---|---|
| 102 | D10001 | https://region-a.***/TN001/D10001/full/20170720-151250.tar.gz | Full (merge process) | Stored | 15:12:50 2017/07/20 15:15:20 |
| 103 | D10001 | https://region-a.***/TN001/D10001/partial/20170721-220040.tar.gz | Differential | Transmission reservation | 2017/07/21 20:00:40 |
| ... | ... | ... | ... | ... | ... |

Table 3 is a backup history management table for managing history information of backup data transmission for each image forming device. Here, the history ID is an identifier that uniquely identifies a backup history. The device ID is an identifier that uniquely identifies an image forming device. Storage destination path information is signed URL information generated by a signed URL generation function 421. A backup type is type information about backup data transmitted from the backup processing unit 401 of the image forming device 102. For example, regarding "full backup" or "differential backup", "full backup (merging process)" is set for a backup history generated in a merging process of a merging process function 426 registered by the function management unit 420 to be described below.

A state column shows a storage state of backup data transmitted from the backup processing unit 401. For example, when backup data is transmitted to the storage service 109 and storing is also completed, this state is set as "stored." When the signed URL is issued but backup data is not transmitted to the storage service 109, "transmission reservation" is set. When the number of generations of backup data or a storage period exceeds a threshold value or when backup data which became unnecessary according to the merging process is deleted, the state is set as "deleted." Of course, other states may be managed. The update date and time is time information about a time at which backup history information is created or updated.

TABLE 4

Function management table

| Function activation ID | Function activation condition | Activation function name | Maximum number of concurrent executions |
|---|---|---|---|
| K100 | When POST to URL [/backup/generate_signed_url] | Signed URL generation function | — |
| K101 | When GET and POST to URL [/backup/config] | Backup setting management function | — |
| K102 | When GET and POST to URL [/backup/history] | Backup history management function | — |
| K103 | When data is stored in full backup storage area of storage service server | Backup completion function | — |
| K104 | When data is stored in differential backup storage area of storage service server | Merge process reservation function. | — |
| K105 | Perform every 1 minute | Merge process function | 1 |
| K106 | Perform every 1 minute | Function call retry function | 1 |
| ... | ... | ... | ... |

Table 4 is a function management table for managing activation conditions of functions that are managed by the function management unit 420 to be described below. Here, a function activation ID is an identifier that uniquely identifies an activation condition of a function. The function activation condition is shown in a column in which an activation condition of an arbitrary function is defined. For example, the signed URL generation function 421 can define conditions such as activation (calling) during POST access to an arbitrary URL. In addition, a condition that a function is activated when data is stored in an arbitrary storage area of the storage service server 109 can be defined.

For example, it can be defined that "a backup completion function 424 is called when data is stored in a full backup data storage area of the storage service server 109." In addition, it can be defined that "a merging process reservation function 425 is called when data is stored in a differential backup data storage area of the storage service server 109." For an activation function name, information about a function activated when a function activation condition is satisfied is defined. The maximum number of concurrent executions defines functions that are simultaneously executed.

Descriptions about tables of various data items that the storage unit 412 manages have been completed above.

Description will return to FIG. 4B. The function management unit 420 manages a function describing a process necessary for an application system function. The function management unit 420 is configured such that functions are associated with arbitrary events described in the function management table in the storage unit 412 and the functions are linked (called), and thus a series of processes can be executed. As an activation form of a function, the virtual machine 314 in FIG. 3 is activated on demand, and the function is executed in the virtual machine 314. Here, the virtual machine 314 may be a lightweight container type application execution environment. The system administrator can set an arbitrary function to be registered through the function management unit 420 and operate in conjunction with the inside of the function or other services.

The signed URL generation function 421 is a function of generating a signed URL in response to a request from the image forming device 102 according to a flow in FIG. 7 to be described below. A backup setting management function 422 is a function of referring to, changing, deleting and adding the backup setting management table in the storage unit 412 in response to a request from another function managed by the image forming device 102 or the function management unit 420. A backup history management function 423 is a function of referring to, changing, deleting, and adding a backup history management table in the storage unit 412 in response to a request from another function managed by the image forming device 102 or the function management unit 420.

The backup completion function 424 is a function of recording, by an application system, a completion process of a backup data upload process, according to a flow in FIG. 9 to be described below. The merging process reservation function 425 is a function of reserving a merging process of differential backup uploaded according to a flow in FIG. 10 to be described below. The merging process function 426 is a function of performing a merging process of differential backup uploaded according to a flow in FIG. 11 to be described below. The function call retry function 427 is a function of calling a function that has failed to be called (merging process) according to a flow in FIG. 12 to be described below and performing again the merging process.

FIG. 4C shows a functional configuration of the storage service 109 as a storage system. Here, an application program of the storage service 109 in FIG. 4C is stored in the storage device 211 in FIG. 2A, read in the RAM 202 and the ROM 203, and executed by the CPU 201.

A backup data reception unit 430 receives backup data generated by the backup processing unit 401 according to a flow in FIG. 8 to be described below. The backup data reception unit 430 performs a backup data storing process, merging process execution determination, and merging process function calling through a signed URL verification unit 431, a full backup data storage unit 432, and a differential backup data storage unit 433.

The signed URL verification unit 431 verifies that additional information of a signed URL connected from the backup processing unit 401 through the backup data reception unit 430 is correct. Here, the signed URL additional information is encrypted token information, information about an expiration date, a data name (file name) to be uploaded or downloaded, a size of a file to be uploaded, and the like. In addition, the signed URL verification unit 431 also verifies that the above additional information has not been tampered with.

The full backup data storage unit 432 performs a full backup data storing process according to a flow in FIG. 8 to be described below. The differential backup data storage unit 433 performs a differential backup data storing process and merging process function calling according to a flow in FIG. 8 to be described below.

This concludes the description of FIG. 3.

<Flow of Backup Process of Image Forming Device 102>

FIG. 5 shows an example of operation procedures of a backup process of the image forming device 102. Here, an application program of the image forming device 102 in FIG. 5 is stored in the storage device 263 in FIG. 2B, read in the RAM 252 and the ROM 253, and executed by the CPU 251. Hereinafter, a flow of processes in which the backup processing unit 401 of the image forming device 102 acquires a signed URL from the application system 108 and backup data is uploaded in the storage service 109 using the signed URL will be described with reference to FIG. 5.

In Step S500, the backup processing unit 401 receives a backup request. The reception of the backup request may be based on an arbitrary UI operation by a user. In addition, the backup request may be received at a timing scheduled in advance according to the setting of a backup transmission interval column of the backup setting management table managed by the storage unit 412 of the application system.

In Step S501, the backup processing unit 401 determines whether the backup request received in Step S500 is first backup after restoring. When the backup request is a first backup request after restoring, the process advances to Step S502, and otherwise, the process advances to Step S504.

In Step S502, the backup processing unit 401 generates full backup of the image forming device 102. Examples of data included in the full backup include network setting value information and license information of the image forming device 102, installed application information, and setting value information attached to the application. Client-specific information that the other image forming device 102 maintains may be included in the client agreement.

In Step S503, the backup processing unit 401 acquires a signed URL necessary for full backup data transmission in connection with the signed URL generation function 421 of the application system 108. In this case, flag information indicating full backup data transmission is added to a request header of the application system 108.

In Step S504, the backup processing unit 401 determines whether the backup request received in Step S500 is a first backup process in the image forming device 102 or an immediate backup request by a user operation. When it is determined that the backup request is a first backup process or an immediate backup request by a user operation, the process advances to Step S505, and otherwise, the process advances to Step S502.

In Step S505, the backup processing unit 401 generates differential backup data composed of difference information from a previously generated full backup or differential backup. As a form of a differential backup, for example, difference data from the previous backup in a form such as an operation log may be generated. Of course, any other form may be used as long as a difference from the previous backup can be determined.

In Step S506, the backup processing unit 401 acquires a signed URL necessary for differential backup data transmission in connection with the signed URL generation function 421 of the application system 108. In this case, flag information indicating differential backup data transmission is added to a request header of the application system 108.

In Step S507, the backup processing unit 401 is connected to the backup data reception unit 430 of the storage service 109 using the signed URL acquired in Step S503 or Step S506. Then, the backup processing unit 401 transmits the backup data generated in Step S502 or Step S505.

In Step S508, the backup processing unit 401 deletes backup data in the image forming device 102 generated in Step S502 or Step S505.

This concludes the description of FIG. 5.

<Flow of Restoring Process of Image Forming Device 102>

Figure 6:
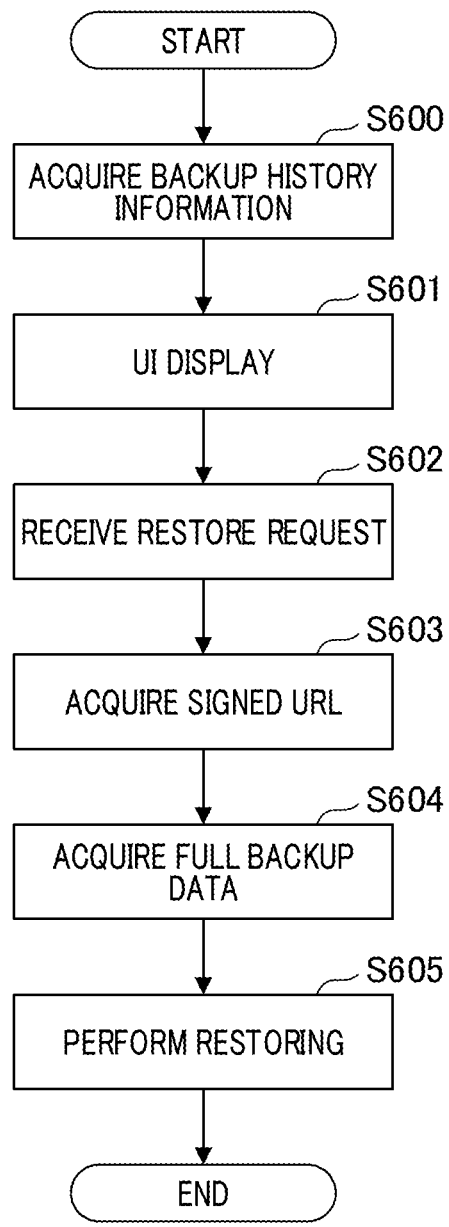
FIG. 6 is a flowchart showing an example of a restoring process.

FIG. 6 shows an example of operation procedures of a restoring process of the image forming device 102. Here, an application program of the image forming device 102 in FIG. 6 is stored in the storage device 263 in FIG. 2B, read in the RAM 252 and the ROM 253, and executed by the CPU 251. Hereinafter, a flow of processes in which the restoring processing unit 402 of the image forming device 102 acquires a signed URL from the application system 108 and backup data is uploaded in the storage service 109 using the signed URL will be described with reference to FIG. 6.

In Step S600, the restoring processing unit 402 of the image forming device 102 acquires its own backup history information from the backup history management function 423 of the application system 108. Step S600 is executed at a timing when a restoring application is activated by the user.

In Step S601, the restoring processing unit 402 presents the backup history information acquired in Step S600 for the user via UI. The user selects a backup through which the image forming device 102 will be restored via a UI.

Here, an example of a UI in Step S601 will be described with reference to FIG. 13.

Figure 13:
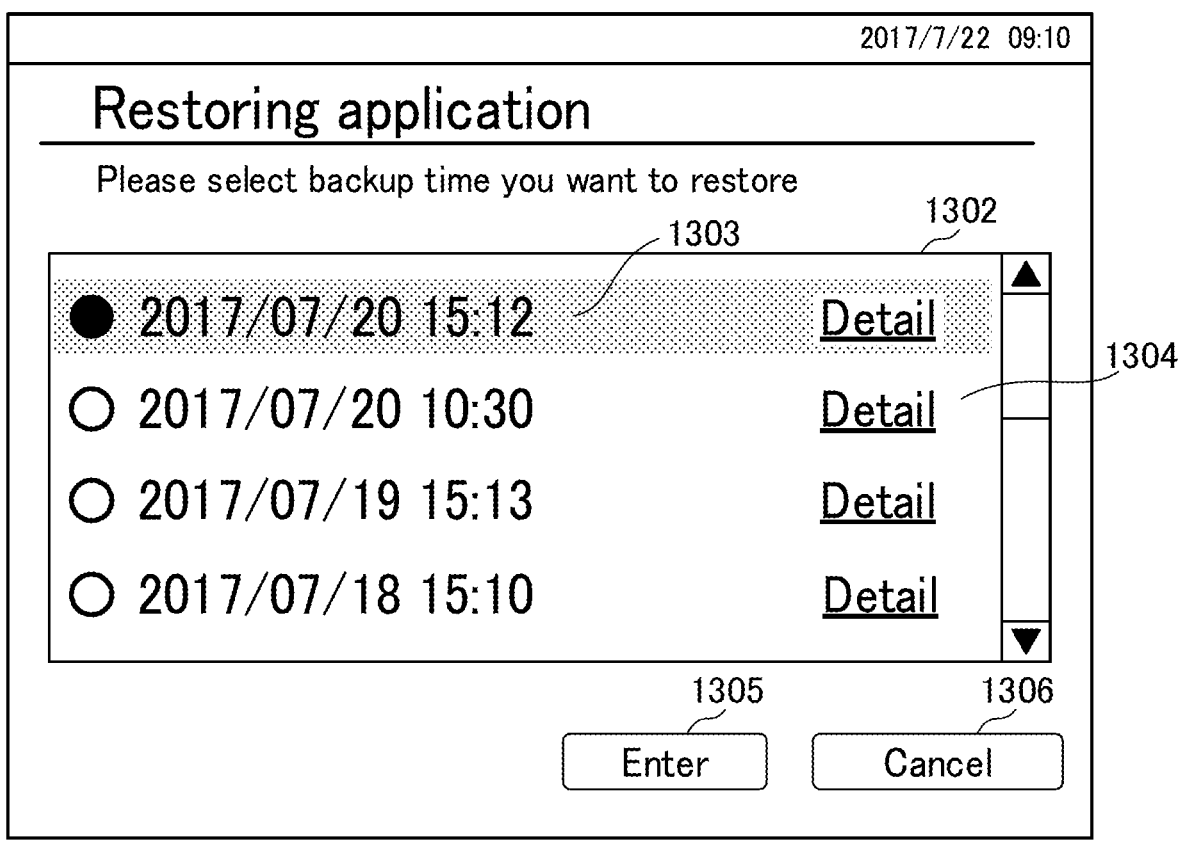
FIG. 13 is a diagram showing an example of a restoring application UI.

FIG. 13 is an example of a UI in Step S601 displayed on a panel of the operation unit 257 of the image forming device 102. 1302 displays lists of a backup history acquired by the restoring processing unit 402 in Step S600. Items of the list in 1302 can be selected by touching on a panel or a pointing device. 1303 shows a selected item and one time point of backup. 1304 indicates a transition link to a detailed information screen of each item. On the detailed information screen, difference content at any backup time can be checked. 1305 is an enter button. When the enter button is pressed, the restoring process of Steps S602 to S605 is performed using the selected item (backup time). 1306 is a cancel button. When the cancel button is pressed, the restoring processing unit 402 ends the UI display and the restoring process.

The backup history displayed in the UI in FIG. 13 is a backup history in which a backup type column of the backup history management table is a "full backup" or a "full backup (merging process)." The differential backup is not included in options. The UI may display a list of backup histories. In addition, when backups are set to be performed many times a day, the UI may display first daily options, drill down, and select a backup used for restoring. In addition, a form of display may be changed depending on whether the backup is scheduled or the user performs backup arbitrarily. For example, a history that the user performs backup arbitrarily may be presented at the beginning of the list display.

This concludes the description of FIG. 13.

Description will return to FIG. 6. In Step S602, the restoring processing unit 402 detects that the user selects an arbitrary backup via the UI presented in Step S601. In Step S603, the restoring processing unit 402 is connected to the signed URL generation function 421 of the application system 108. In addition, in Step S601, a signed URL for downloading the selected backup data is acquired. In this case, flag information indicating that it is a backup data acquisition request and information indicating to which backup data a signed URL is related are added to a request header of the application system 108. For example, the history ID acquired in Step S600 is added.

In Step S604, the restoring processing unit 402 performs downloading from the full backup data storage unit 432 of the storage service 109 using the signed URL acquired in Step S603. In Step S605, the restoring processing unit 402 performs a process of restoring a storage area of the image forming device 102 using the backup data acquired in Step S604. Here, Step S605 includes a process necessary for a restoring process such as restoring of setting information in restoring, restoring of an application, restoring of application setting, and reactivation.

This concludes the description of FIG. 6.

<Flow of Function Call of Application System 108>

Figure 14:
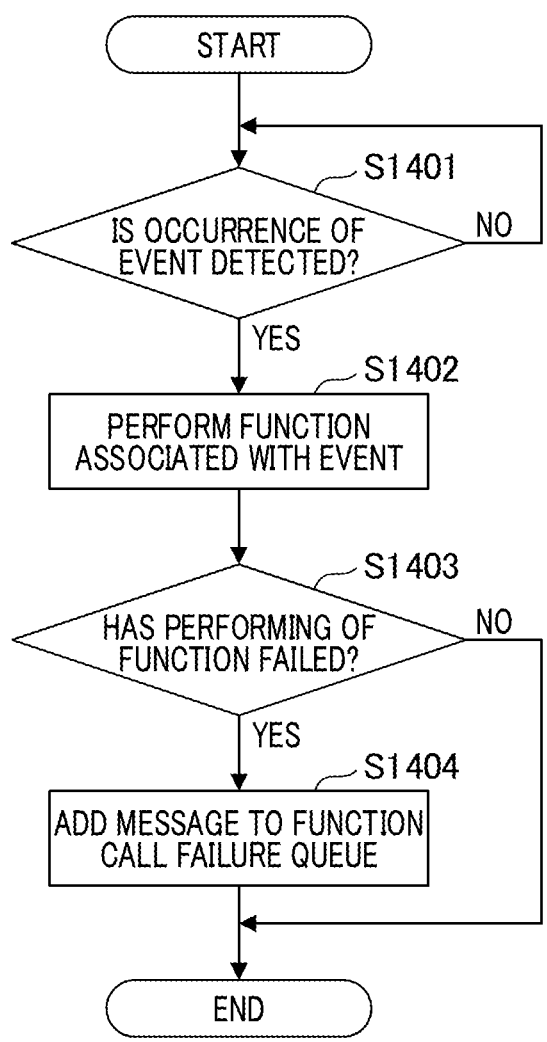
FIG. 14 is a flowchart showing an example of an event detection and function call process.

FIG. 14 shows an example of a process of the event detection unit 410 of the application system 108 calling functions managed by the function management unit 420. Here, an application program of the application system 108 in FIG. 14 is read in a memory area that is virtually formed in the virtual machine (container) 314 in FIG. 3 and executed by a virtual CPU in the virtual machine (container) 314. Hereinafter, a process of the event detection unit 410 of the application system 108 calling functions managed by the function management unit 420 will be described with reference to FIG. 14.

In Step S1401, the event detection unit 410 detects whether an event that satisfies a function activation condition of the function management table in the storage unit 412 occurs. Examples of types of events to be detected include an access event by GET or POST to an arbitrary URL and a storage completion event in which data is stored in an arbitrary storage area of the storage service server 109. In Step S1401, various event processes related to other application system 108 are monitored. When an event occurs in the application system 108, the event detection unit 410 determines whether the event is an event that satisfies the function activation condition of the function management table in the storage unit 412. When it is determined that the event is an event that satisfies the function activation condition, the process advances to Step S1402, and otherwise, monitoring of an event continues.

In Step S1402, a function associated with the function activation condition detected in Step S1401 is called. In Step S1403, it is determined whether the function call process in Step S1402 has failed. When it is determined that the function call process has failed, the process advances to Step S1404, and otherwise, the process ends. Here, an example of the reason for function call failure is that the virtual machine (container) 314 of the cloud infrastructure 110 in FIG. 3 is not called due to insufficient resources. Of course, function call failure due to other reasons may be detected.

In Step S1404, a message is added to the function call failure queue. The message includes information about a function that has failed to be called and information about parameters to be provided to the function.

This concludes the description of FIG. 14.

<Processing Flow of Signed URL Generation Function 421 of Application System 108>

Figure 7:
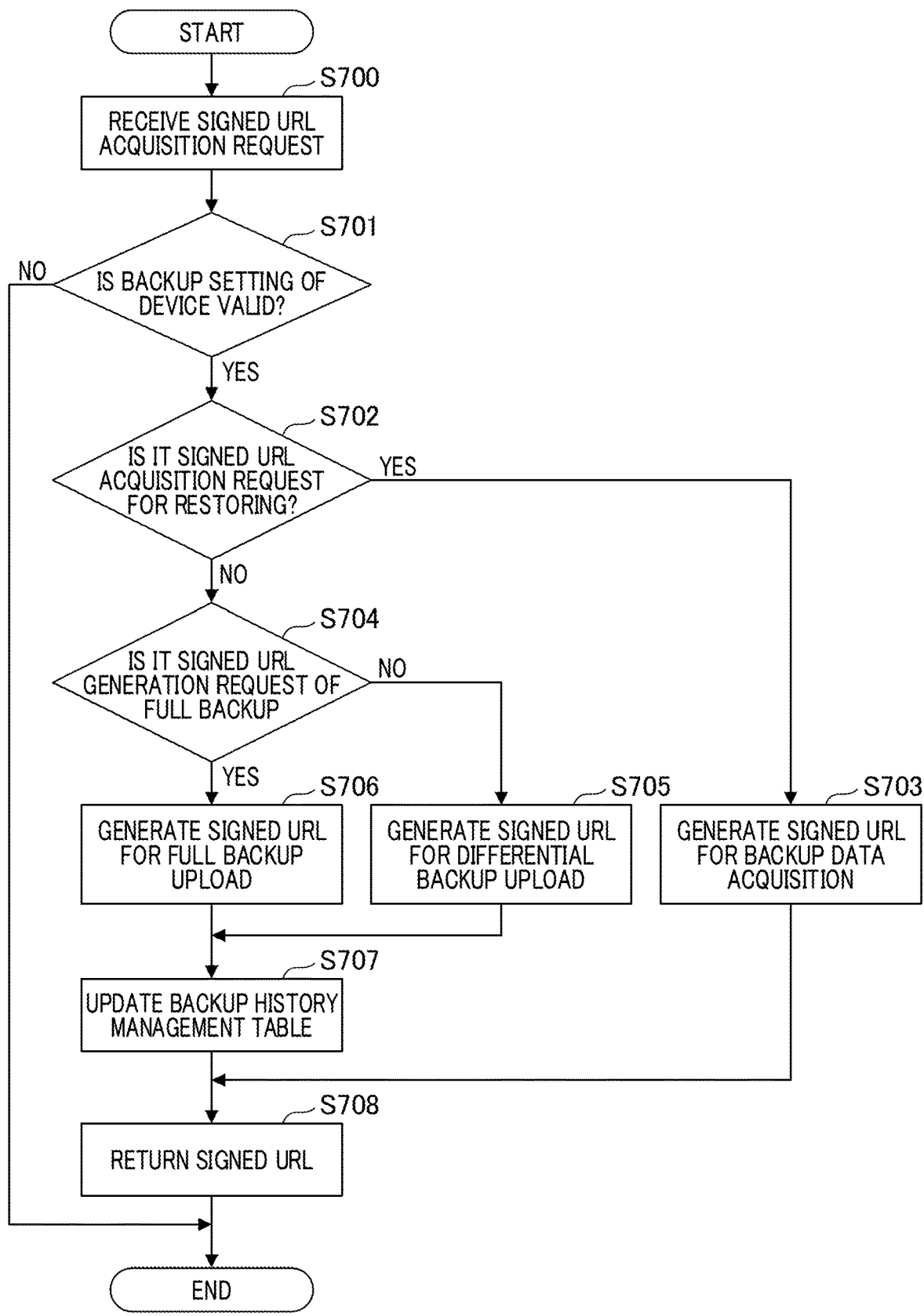
FIG. 7 is a flowchart showing an example of a signed URL generation process.

FIG. 7 shows an example of an operation process of the signed URL generation function 421 of the application system 108. Here, a function group of the application system 108 in FIG. 7 is read in a memory area virtually formed in the virtual machine (container) 314 in FIG. 3 and executed by a virtual CPU in the virtual machine (container) 314. Hereinafter, a flow of processes in which the application system 108 generates a signed URL in response to a request from the backup processing unit 401 and the restoring processing unit 402 of the image forming device 102 will be described with reference to FIG. 7. Here, the signed URL generation function 421 is a function called in response to an HTTP request from the backup processing unit 401 and the restoring processing unit 402 of the image forming device 102 according to the function activation condition in the function management table.

In Step S700, the signed URL generation function 421 of the application system 108 receives a signed URL acquisition request in S503 or S506 in FIG. 5 and S603 in FIG. 6. In Step S701, the signed URL generation function 421 refers to the backup setting management table in the storage unit 412 and acquires a backup service contract state of an image forming device of a signed URL acquisition request source. When the backup service contract state of the image forming device is under contract, the process advances to Step S701, and otherwise, the process ends. When the process ends, information indicating that an authorization error occurred is returned to the image forming device 102.

In Step S702, the signed URL generation function 421 determines whether the signed URL acquisition request received in Step S700 is a signed URL acquisition request for restoring. When it is determined that the signed URL acquisition request received in Step S700 is a signed URL acquisition request for restoring, the process advances to Step S703, and otherwise, the process advances to Step S704. As a method of determining whether the signed URL acquisition request received in Step S700 is a signed URL acquisition request for restoring, the following may be used. For example, the method may be realized by incorporating a restoring process flag into a request header in the process of Step S603 in FIG. 6 or realized by related information that can be determined as other restoration.

In Step S703, the signed URL generation function 421 generates a signed URL for backup data acquisition for returning to the restoring processing unit 402. In this case, a signed URL for acquisition associated with arbitrary backup data is issued with reference to the backup history management table based on history ID information included in the request header of the acquisition request in Step S700.

In Step S704, the signed URL generation function 421 determines whether the signed URL acquisition request received in Step S700 is a signed URL acquisition request for full backup data transmission. When it is determined that the signed URL acquisition request is a signed URL acquisition request for full backup data transmission, the process advances to Step S706, and otherwise, the process advances to Step S705. In this case, as a method of determining whether the signed URL acquisition request is a signed URL acquisition request for full backup data transmission, information about a flag added to the request header in Step S503 in FIG. 5 may be used.

In Step S705, the signed URL generation function 421 generates a signed URL for differential backup data transmission. In Step S706, the signed URL generation function 421 generates a signed URL for full backup data transmission. In Step S707, the signed URL generation function 421 updates the backup history management table in the storage unit 412. A new history ID is issued, and information including a device ID, storage destination path information, a backup type, a state, and update date and time is added. In this case, "transmission reservation" is recorded in the state column.

In Step S708, the signed URL generation function 421 returns the signed URL generated in Steps S706, S705, and S703 to the image forming device 102.

This concludes the description of FIG. 7.

<Flow of Backup Data Storing Process of Storage Service 109>

Figure 8:
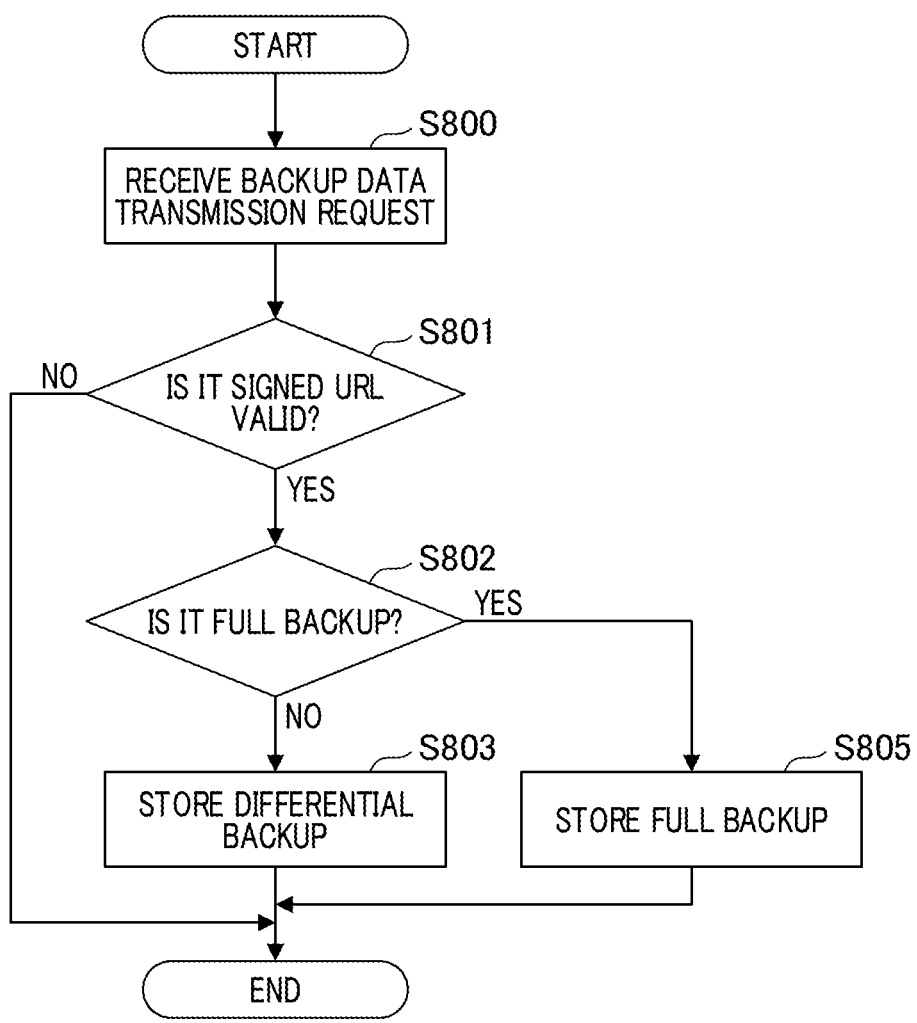
FIG. 8 is a flowchart showing an example of a backup data storing process.

FIG. 8 shows an example of a backup data storing process of the storage service 109. Here, an application program of the storage service 109 in FIG. 8 is stored in the storage device 211 in FIG. 2A, read in the RAM 202 and the ROM 203, and executed by the CPU 201. Hereinafter, a flow of processes in which the backup data reception unit 430 of the storage service 109 stores backup data in response to a request from the backup processing unit 401 and the restoring processing unit 402 of the image forming device 102 will be described with reference to FIG. 8.

In Step S800, the backup data reception unit 430 receives a backup data transmission request from the backup processing unit 401 of the image forming device 102. In Step S801, the signed URL verification unit 431 verifies signed URL additional information of the backup data transmission request received in Step S801. Examples of content to be verified include signed URL additional information that can be correctly decrypted and has not been tampered with and whether an expiration date is within the deadline. When it is determined that the signed URL is correct based on the verification result, the process advances to Step S802, and otherwise, the process ends. When the process ends, information indicating that an authorization error occurred is returned to the image forming device 102.

In Step S802, the backup data reception unit 430 determines whether the backup data transmission request received in Step S800 is a full backup data transmission request. When it is determined that the backup data transmission request is a full backup data transmission request, the process advances to Step S805, and otherwise, the process advances to Step S803. In this case, as a method of determining whether it is a signed URL acquisition request for full backup data transmission, information about a flag added to the request header in S507 in FIG. 5 may be used.

In Step S803, the differential backup data storage unit 433 allows a backup data transmission request from the backup processing unit 401 of the image forming device 102. In addition, the differential backup data storage unit 433 receives differential backup data and stores data according to storage destination path information attached to a signed URL.

In Step S805, the full backup data storage unit 432 allows a backup data transmission request from the backup processing unit 401 of the image forming device 102. In addition, the full backup data storage unit 432 receives full backup data and stores data according to storage destination path information attached to a signed URL.

This concludes the description of FIG. 8.

<Processing Flow of Backup Completion Function 424 of Application System 108>

Figure 9:
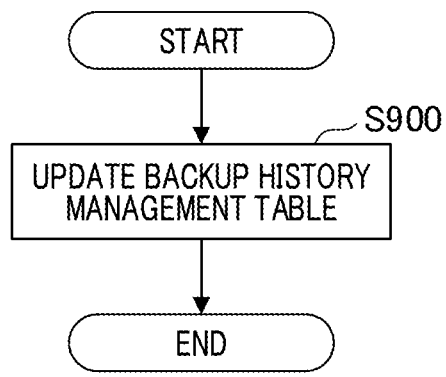
FIG. 9 is a flowchart showing an example of a backup completion process.

FIG. 9 shows an example of a process of the backup completion function 424 of the application system 108. Here, a function group of the application system 108 in FIG. 9 is read in a memory area virtually formed in the virtual machine (container) 314 in FIG. 3 and executed by a virtual CPU in the virtual machine (container) 314. Hereinafter, a flow of a backup completion function which is a function registered in the function management unit 420 of the application system 108 will be described with reference to FIG. 9. Here, the backup completion function 424 is a function called after the process of Step S805 ends in the backup data storing process in FIG. 8 according to the function activation condition in the function management table.

In Step S900, the backup completion function 424 updates the backup history management table in the storage unit 412. In this case, the backup completion function 424 receives storage destination path information of backup data in the process of Step S806 in the backup data storing process in FIG. 8 as parameters. In addition, the backup completion function 424 updates the "state" column of a record that matches the storage destination path information as "stored." The update date and time column is also updated.

This concludes the description of FIG. 9.

<Processing Flow of Merging Process Reservation Function 425 of Application System 108>

Figure 10:
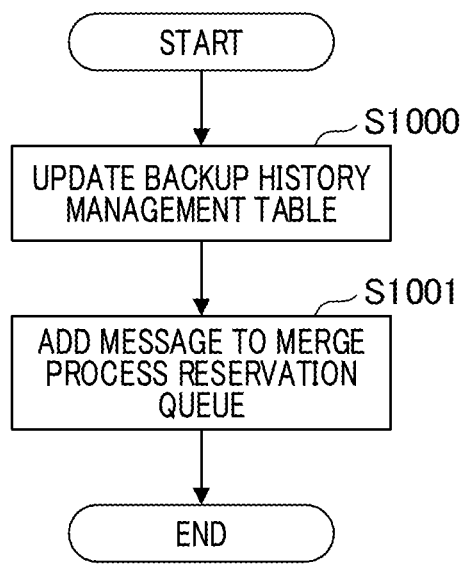
FIG. 10 is a flowchart showing an example of a merging process reservation function.

FIG. 10 shows an example of a process of the merging process reservation function 425 of the application system 108. Here, a function group of the application system 108 in FIG. 10 is read in a memory area virtually formed in the virtual machine (container) 314 in FIG. 3 and executed by a virtual CPU in the virtual machine (container) 314. Hereinafter, a flow of a merging process reservation function which is a function registered in the function management unit 420 of the application system 108 will be described with reference to FIG. 10. Here, the merging process reservation function 425 is a function called after the process of Step S803 ends in the backup data storing process in FIG. 8 according to the function activation condition in the function management table. Since the merging process is unnecessary when the process of S805 ends, there is no call of the same function.

In Step S1000, the merging process reservation function 425 updates the backup history management table in the storage unit 412. In this case, the merging process reservation function 425 receives storage destination path information of backup data in the process of Step S804 in the backup data storing process in FIG. 8 as parameters. In addition, the merging process reservation function 425 updates the "state" column of a record that matches the storage destination path information as "stored." The update date and time column is also updated.

In Step S1001, the merging process reservation function 425 adds a message to a previously prepared merging process reservation queue. The message includes history ID information of the record updated in Step S1000.

This concludes the description of FIG. 10.

<Processing Flow of Merging Process Function 426 of Application System 108>

Figure 11:
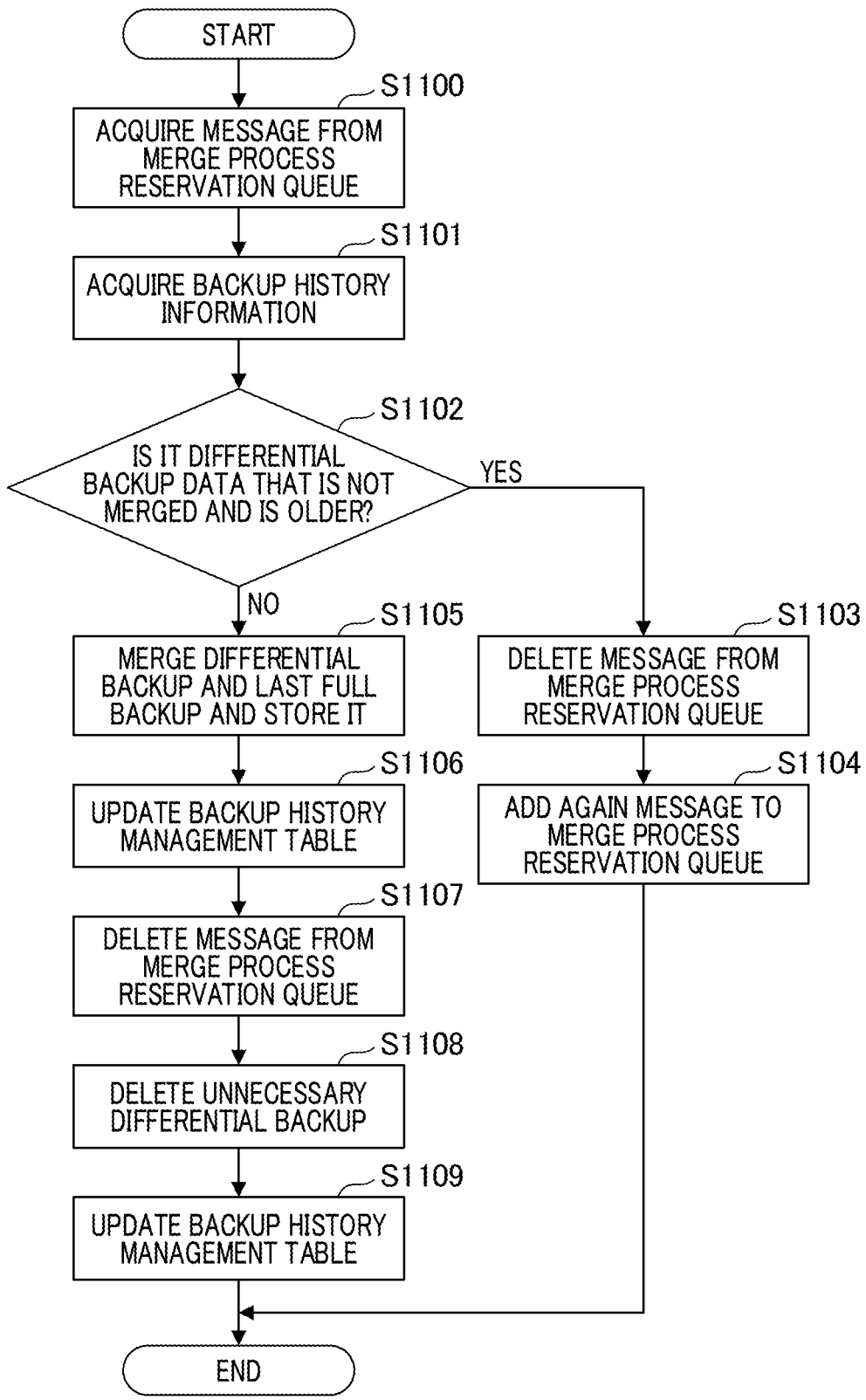
FIG. 11 is a flowchart showing an example of a merging process function.

FIG. 11 shows an example of the merging process function 426 of the application system 108. Here, a function group of the application system 108 in FIG. 11 is read in a memory area virtually formed in the virtual machine (container) 314 in FIG. 3 and executed by a virtual CPU in the virtual machine (container) 314. Hereinafter, a flow of a merging process function which is a function registered in the function management unit 420 of the application system 108 will be described with reference to FIG. 11. Here, the merging process function is a function that is periodically called according to the function activation condition in the function management table.

In Step S1100, the merging process function 426 acquires a message from the merging process reservation queue. In Step S1101, the merging process function 426 acquires a backup history information list of the related image forming device from the backup history management table based on history ID information included in the message acquired in Step S1100.

In Step S1102, the merging process function 426 determines whether there is differential backup information that is not merged and is older than that of the history ID acquired in Step S1100 in the backup history information list acquired in Step S1101. Here, determination of whether it is not merged may be performed by determination of whether the state column in the backup history management table is "deleted." When it is determined that there is differential backup information that is not merged and is older than that of the history ID acquired in Step S1100, the process advances to Step S1103, and otherwise, the process advances to Step S1105.

In Step S1103, the merging process function 426 deletes the message acquired in Step S1100 from the merging process reservation queue. Here, the message of the merging process reservation queue will not disappear unless a deletion process is intentionally performed by a program.

In Step S1104, the merging process function 426 adds again the message acquired in Step S1100 to the merging process reservation queue. Here, a series of processes of Step S1102 to Step S1104 are processes in consideration of a case in which calling of the merging process function has failed after the process of Step S803 in FIG. 8. When calling has failed, the process in FIG. 10 for differential backup data corresponding to the process in Step S803 is skipped. That is, in the processes of S1103 to S1104, when the merging process is performed in differential backup order, it is possible to adjust the consistency of full backup data generated in the merging process.

In Step S1105, the merging process function 426 merges a differential backup associated with the history ID acquired in Step S1100 and the most recently stored full backup data acquired in Step S1101 to generate new full backup data. When full backup data is successfully generated, the merging process function 426 stores the full backup data generated in the full backup data storage unit 432 of the storage service 109.

Here, the merging process may be performed by, for example, tracing an operation log of the image forming device included in differential backup data, extracting setting value information at the final time point related to the image forming device, and reflecting the setting value information in the latest full backup data.

In Step S1106, the merging process function 426 updates the backup history management table in the storage unit 412. A new history ID associated with full backup data in Step S1105 is issued and information including a device ID, storage destination path information, a backup type, a state, and update date and time is added. In this case, "full backup (merging process)" is recorded in the backup type column and "stored" is recorded in the state column.

In Step S1107, the merging process function 426 deletes the message acquired in Step S1100 from the merging process reservation queue. In Step S1108, the merging process function 426 deletes the differential backup data used when the merging process in Step S1105 is performed from the differential backup data storage unit 433 of the storage service 109. In Step S1109, the merging process function 426 updates the backup history management table in the storage unit 412. The state column of a record of a history ID associated with differential backup data deleted in Step S1108 is updated as "deleted."

This concludes the description of FIG. 11.

<Processing Flow of Function Call Retry Function 427 of Application System 108>

Figure 12:
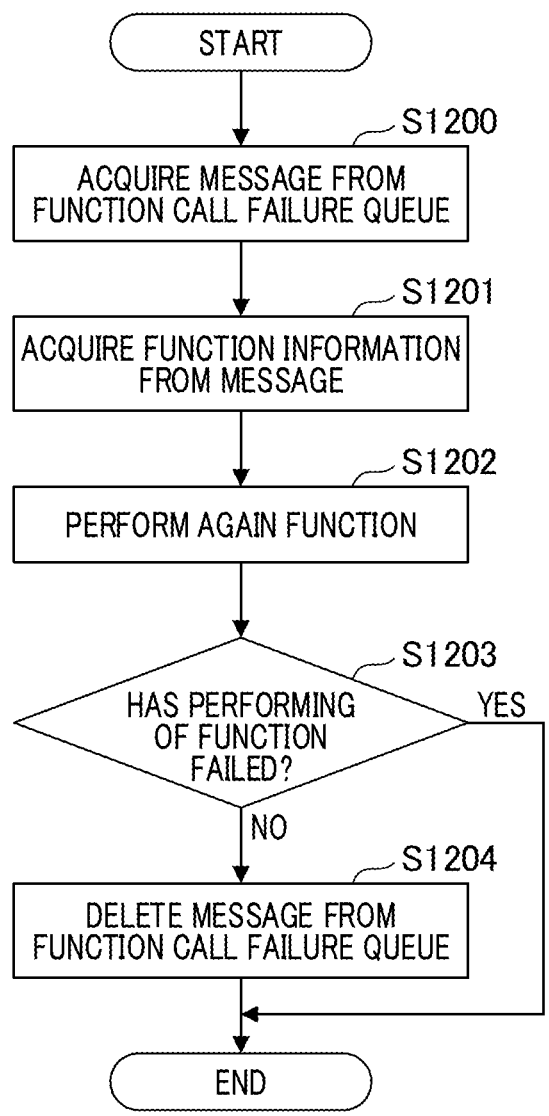
FIG. 12 is a flowchart showing an example of a function call retry function.

FIG. 12 shows an example of the function call retry function 427 of the application system 108. Here, a function group of the application system 108 in FIG. 12 is read in a memory area virtually formed in the virtual machine (container) 314 in FIG. 3 and executed by a virtual CPU in the virtual machine (container) 314. Hereinafter, a flow of the function call retry function 427 which is a function registered in the function management unit 420 of the application system 108 will be described with reference to FIG. 12. Here, the function call retry function 427 is a function that is periodically called according to the function activation condition in the function management table.

In Step S1200, the function call retry function 427 acquires a message from the function call failure queue. In Step S1201, the function call retry function 427 acquires information about a function that has failed to be called from the message acquired in Step S1200. Here, function information is, for example, information such as a function name that can uniquely identify a function. In Step S1202, the function call retry function 427 calls and retries again a function that has failed to be called acquired in Step S1201 using parameter information included in the message acquired in Step S1200.

In Step S1203, the function call retry function 427 determines whether a function call has failed in the process of Step S1202. When it is determined that the function call process has failed, the process advances to Step S1204, and otherwise, the process ends. In Step S1204, the function call retry function 427 deletes the message acquired in Step S1200 from the function call failure queue. Here, the message acquired in Step S1200 can be acquired again from the function call failure queue after a certain time unless it is explicitly deleted in Step S1204.

This concludes the description of FIG. 12.

(Conclusion)

As described above, according to this example, the application system 108 performs the merging process of differential backup data at a timing at which the image forming device 102 uploads backup data to the storage service 109 using a signed URL. In addition, when the image forming device 102 requires restoring, the restoring process is performed with merged full backup data. Thereby, there is no need for the image forming device 102 to acquire all necessary differential backup data from the storage service 109. In addition, since the merging process on the side of the image forming device is not necessary, a time required to restoring completion is shortened as a result.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-023424, filed Feb. 13, 2018, which is hereby incorporated by reference wherein in its entirety.

What is claimed is:

1. A system comprising a network device, a storage system, and a data management system,
   wherein the network device comprises a first request unit configured to issue a first request for requesting URL information indicating a storage destination where data, which is stored in a storage device of the network device, is stored as backup data;
   wherein the data management system comprises:
   a generation unit configured to generate URL information indicating the storage destination at a time when the first request is received; and
   a first response unit configured to provide the generated URL information indicating the storage destination to the network device in response to the first request; and
   wherein the network device further comprises a transmission unit configured to transmit data, which is stored in the storage device, using the URL information received in response to the first request; and
   wherein, when the data transmitted from the network device is not full backup data, but is differential backup data, a process of merging full backup data having been managed in the storage system and the differential backup data is performed,
   wherein the generation unit generates authorized URL information indicating a storage area corresponding to a call of a function for starting the merging process as the URL information, and
   wherein the process of merging is started according to the function called in response to storing of the differential backup data in the storage system using the authorized URL information.

2. The system according to claim 1,
   wherein, when the first request from the network device is a request for a storage destination in which the differential backup data is stored, the data management system responds with the authorized URL information, and
   wherein the merging process is performed based on the fact that data is stored in the storage destination provided for storing the differential backup data.

3. The system according to claim 2,
   wherein the system further includes a queue, wherein a message is registered in the queue based on the called function, and
wherein the merging process is performed according to the message managed in the queue.

4. The system according to claim 3,
wherein, when data transmitted from the network device is full backup data, the function is not called.

5. The system according to claim 3,
wherein, when the function in response to the event fails to be called, a different function is additionally called, and
wherein, based on the different function, a message for the merging process using the differential backup data is registered in the queue.

6. The system according to claim 1,
wherein the network device further comprises:
a second request unit configured to issue a second request for restoring to the data management system; and
an acquisition unit configured to acquire full backup data stored in the storage system using information indicating a storage destination received from the data management system in response to the second request.

7. The system according to claim 1,
wherein the full backup data includes at least one of setting information and address information of the network device and information about an installed application.

8. A method using a system including a network device, a storage system, and a data management system, the method comprising:

a process of issuing a first request for requesting URL information indicating a storage destination where data, which is stored in a storage device of the network device, is stored as backup data in the network device;
a process of generating URL information indicating the storage destination at a time when the first request is received; and
a process of providing the generated URL information indicating the storage destination to the network device in response to the first request in the data management system; and
a process of transmitting data, which is stored in the storage device, using the URL information received in response to the first request in the network device,
wherein, when the data transmitted from the network device is not full backup data, but is differential backup data, a process of merging full backup data having been managed in the storage system and the differential backup data is performed,
wherein the generated URL information is authorized URL information indicating a storage area corresponding to a call of a function for starting the merging process, and
wherein the process of merging is started according to the function called in response to storing of the differential backup data in the storage system using the authorized URL information.

* * * * *